Feb. 7, 1933.    M. BUCHNER    1,896,697
PROCESS OF DECOMPOSITION OF COMPLEX HYDROFLUORIC SALTS
Filed July 26, 1927    3 Sheets-Sheet 1
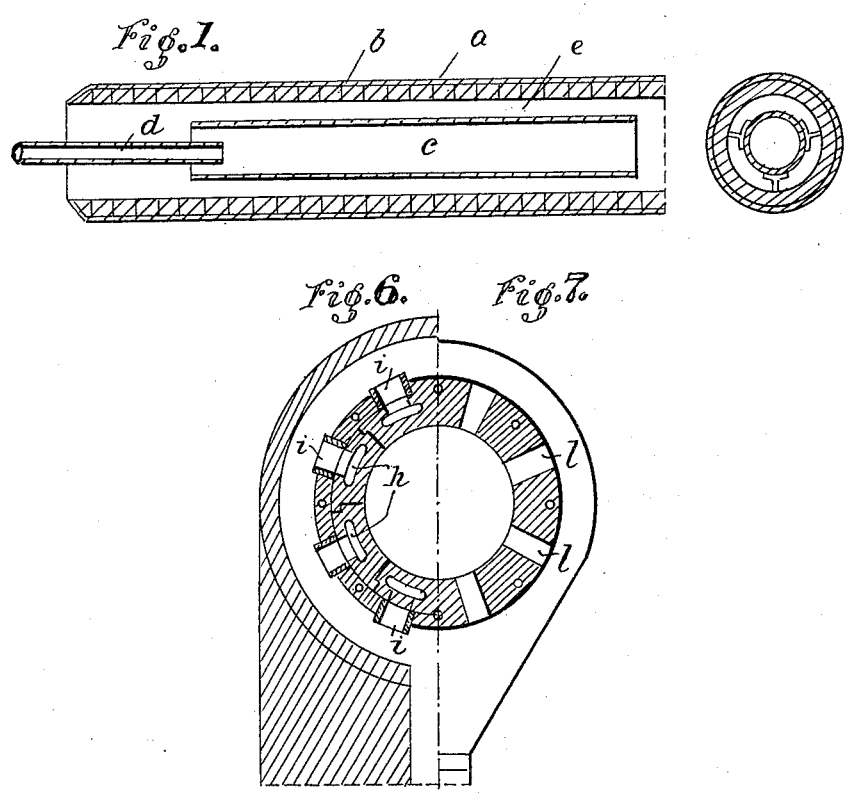

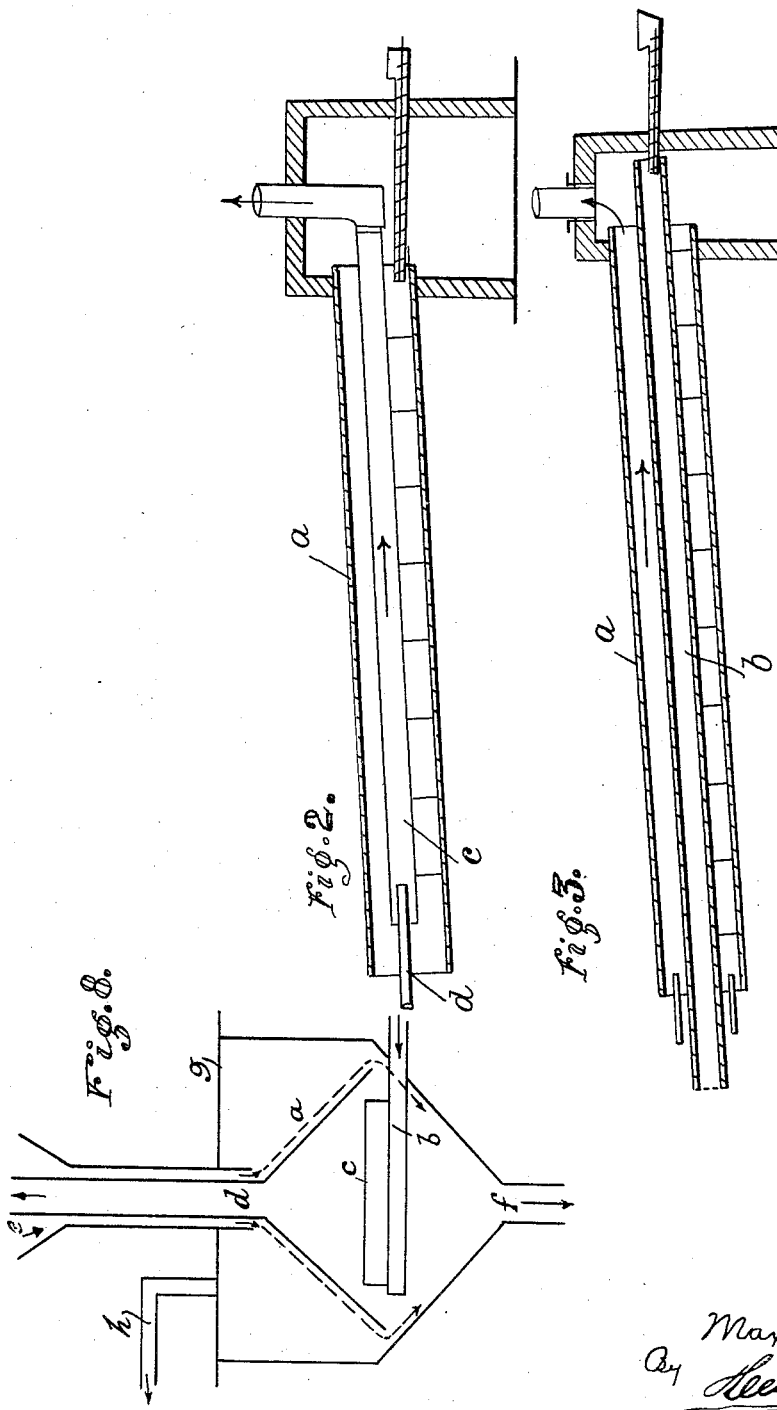

Feb. 7, 1933. M. BUCHNER 1,896,697
PROCESS OF DECOMPOSITION OF COMPLEX HYDROFLUORIC SALTS
Filed July 26, 1927 3 Sheets-Sheet 3
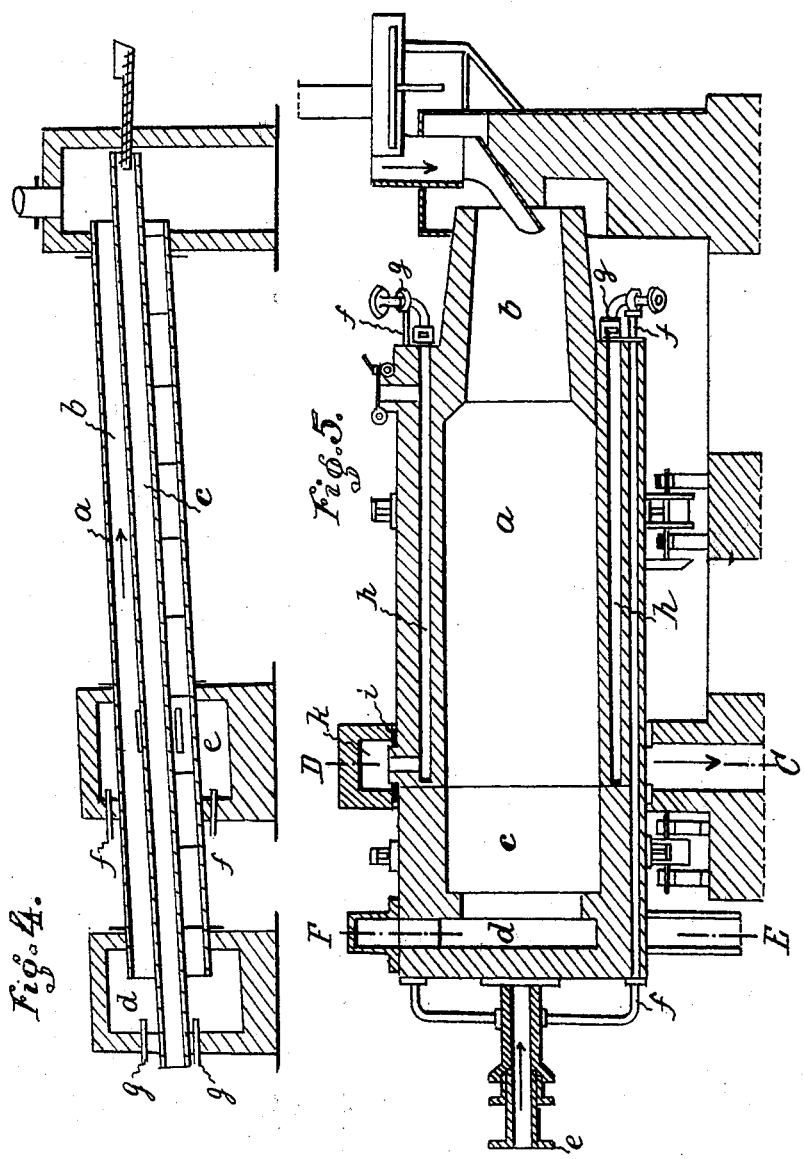
Inventor
Max Buchner
By
atty.

Patented Feb. 7, 1933

1,896,697

UNITED STATES PATENT OFFICE

MAX BUCHNER, OF HANOVER-KLEEFELD, GERMANY

PROCESS OF DECOMPOSITION OF COMPLEX HYDROFLUORIC SALTS

Application filed July 26, 1927, Serial No. 208,607, and in Germany July 26, 1926.

This invention relates to the decomposition of complex hydrofluoric salts and the method consists in heating the complex hydrofluoric salts in an oven.

The decomposition of complex hydrofluoric salts, as sodium silico fluoride, potassium silico fluoride, barium silico fluoride and similar complex fluorides, by heating presented up to the present unsurmountable difficulties as one could not succeed in completely decomposing for instance sodium silico fluoride into silicon fluoride and sodium fluoride.

It has been found that the decomposition of the complex hydrofluoric salts takes place smoothly and perfectly when partial melting and sintering of the complex fluoride-salts is avoided during heating in the oven. The condition to be fullfilled is to apply as uniform a heating as possible, in order to avoid excessive local heating, or to heat the total quantity of the material to be decomposed as rapidly as possible to a very high degree of temperature so that the total quantity is melted. When the material to be decomposed is irregularly heated, either certain portions being melted or sintered prematurely, or certain portions remaining unmelted, the material to be decomposed conglomerates and the particles of undecomposed salts enclosed in the conglomerated mass cannot be decomposed even by application of strong and long heating. These inconveniences are obviated when, according to this invention, the heating is carried out in such a manner that any partial melting or sintering of the material to be decomposed is avoided. When working at a temperature below the sintering- or melting-point the material remains in the shape of a loose powder and all the particles remain exposed to the action of the heat. In this case it is advisable to maintain the material in movement during the treatment. When working at high temperatures, i. e. from the start for the complete melting of the material, a molten mass, which is easily liquefied is obtained all of which is decomposed.

The complex fluoride salts may be submitted to the treatment either alone or with suitable additions which facilitate or favor the decomposition or the complete melting. It has been found to be advisable to withdraw as speedily as possible the gaseous dissintegration-component, for instance $SiF_4$, when decomposing hydrofluoric salts, as the decomposition is thereby accelerated.

The withdrawing of the gaseous decomposition-component can be effected, for instance by blowing-in gases which carry along the gaseous decomposition-component. Another possibility is the working in a gas-dilated space or in the vacuum, the gases generated being withdrawn directly after the generation by the suction of the vacuum-pump. When working in a vacuum or in the gas-dilated space, gases may also be blown in.

The gases or gas-mixtures, in the presence of which the decomposition-reaction is advantageously carried out include, besides air, steam, oxygen, flue-gases, producer-gas and reducing or oxidizing gases in general.

Although presence of water is not prejudicial to the decomposition, it is advisable to work, to avoid secondary reactions during the conveyance of the volatile fluoride, with dry gases, absolutely freed from any percentage of water. A reaction with water is thus avoided also at the subsequent cooling of the volatile fluoride, for instance of silicon fluoride.

During decomposition of the complex-fluorides, for instance of sodium-silico-fluoride, in a rotary tubular furnace the gases to be added may be automatically admixed to the gases of combustion. Regulation of the temperature of the flame can thus be attained also. It is surprising that, when working at corresponding high temperatures, secondary reactions can be avoided. The decomposition of silicon-fluoride in presence of water may for instance be prevented by increasing the temperature while carrying on the reaction according to the equation:

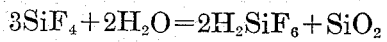

$$3SiF_4 + 2H_2O = 2H_2SiF_6 + SiO_2$$

Also sulphurous-acid contained for instance in the producer gas or the carbon-dioxide produced during combustion of producer-gas may be made ineffective for the complex-fluoride as well as for the products of decomposition.

The gases, instead of being supplied into the furnace, may be produced in the decomposition-space by introducing into this space substances from which such gases are generated.

On the other hand it is advisable to take care, that the solid product of decomposition, which has been produced and which is sintered or molten, is rapidly removed. This is important specially when working in continuous operation, for instance in rotatable tubular furnaces. The reason for this measure and the main idea of the method in general is the avoidance of partial melting or sintering.

The solid decomposition-products, which adhere to the walls of the heating spaces, might easily cause melting or sintering at certain points, owing to the production of an eutenic-mixture between the material to be decomposed on the one hand and solid decomposition-product on the other hand.

It is advisable to add to the material to be treated, prior to the charging, small quantities of the solid salt-particles produced by the decomposition. The condition is, however, that the mixture which is produced be as homogenous as possible, sodium-fluoride being added for instance in quantities of about 10% to the sodium-silico fluoride to be decomposed, whereby a smoother and more rapid decomposition and generally a higher output of the furnace is obtained. Instead of the solid salt-particles produced during decomposition another simple fluoride may be used, for instance the addition of fluorspar is of advantage.

The method according to the application may be carried out in stationary or in moving heating chambers or in stationary heating chambers with moving of the material to be heated. As example of stationary heating chambers may be mentioned furnaces with lashing flames, so called reverberatory-furnaces and further so called box-furnaces. As moving heating chamber the rotary tubular furnace may be mentioned. Heating chambers which are stationary themselves, in which however the material to be decomposed is moved, are for instance inclined retorts.

When stationary heating chambers are used, a heating installation may be utilized after the manner of the glass-boxes, the heating flames being alternately conducted from several sides over said box. A smaller auxiliary box, eventually transportable, would be arranged in front of the melting box proper, the molten material being taken for further treatment from this auxiliary box. In this case the forehearth may be constructed as a rotary receptacle for the molten material, from which the molten mass flows continuously over an overflow.

When the rotary tubular furnace is utilized for carrying out the new method, arrangements are preferably provided which make it possible to accurately maintain predetermined temperatures. The heating space filled with the material to be treated must be of such shape that local excessive heating at certain points be avoided.

For the combustion of the fuels devices are preferably used which permit of carrying through the combustion at several points which are distributed over the whole heating space or over a portion of the same, or the flame alone or the flame and the heating gases are separated from the material to be decomposed by a partition or one allows the combustion to take place at several points in the heating chamber and separates the flame and the heating gases from the material to be heated by a partition or by partitions.

When it is desirable to apply such temperatures that complete direct smelting of the complex-fluoride to be decomposed takes place, the material will be introduced into the heating spaces in close proximity to the source of heat, so that the material to be treated is brought rapidly to high temperatures. The complex-hydrofluoric-salts are for instance brought into direct contact with highly heated heating-surfaces or they are charged into the furnaces together with the fuel or into the treating-space together with or by hot gases. In this case care has to be taken that the mass be maintained in the molten state in the treating-chamber, the heating space being heated as uniformly as possible.

Referring to the accompanying drawings which show several types of furnaces for carrying out the invention, Figure 1 shows a longitudinal tubular rotating furnace.

Figs. 2 and 3 are similar views of other constructions of rotating furnaces.

Fig. 4 is a view showing the use of a plurality of external heating or combustion chambers for a rotating furnace.

Fig. 5 is a longitudinal section of a rotary tubular furnace showing structural details.

Figs. 6 and 7 are cross sections on lines C—D and E—F respectively, of Fig. 5.

Fig. 8 is a diagrammatic view of a vertically arranged rotating furnace for carrying out the process.

If the object is, to keep the material separated from the flame this is obtained, according to the invention, by the arrangement Fig. 1. In the revolving furnace $a$ having the lining $b$ a tube $c$ is arranged which is rigid with the furnace. Into this tube $c$ projects the nozzle $d$ through which the gas or the coal dust is supplied. The flame is formed in the tube $c$ and heats the walls of the same. By convenient selection of the thickness of the wall the drop of temperature in the wall of tube $c$ can be regulated so that the external temperature of the tube $c$ cannot become dangerous for the material which might drop upon the tube. The heat transition into the annular space $e$ of the revolving furnace from the tube $c$ takes place mainly by radiation, but also by convection. The length of the tube $c$ is such that the heating gases, when flowing out of the tube $c$, have only a suitably low temperature.

By extending the tube $c$ through the whole furnace a separation of the heating gases from the material can be obtained, this being of importance in such cases in which the heating gases contain much dust, which would render the material inferior, or if the heating gases themselves have an unfavorable effect upon the material, or if during heating gaseous products are produced from the material to be decomposed which must not be diluted by the heating gases. In this arrangement, shown in Fig. 2, only the first portion of the tube consists of refractory material, the end of the tube consisting of inferior material which is sufficient for the usual heat requirements.

If a material has to be heated which has the tendency to form lumps, the danger would exist, at the application of the arrangement shown in Figs. 1 or 2 that in the annular space $e$, Fig. 1, clogging is produced. This is avoided by an arrangement, in accordance with the invention, as shown in Fig. 4. In Fig. 4 the revolving furnace $a$ is provided with a tube $c$ which is concentrically fixed in the furnace and rotates with the same. The flame burns in or before the annular space, whilst the material travels through the inner tube $c$. As this tube has a smooth inner wall, it is easy to remove crusts and the state of the inner tube can be easily observed during the serving as no supports prevent the inspection. This arrangement is, so to say, a reversal of the arrangement shown in Fig. 2, and it presents the same advantages as regards separating of the material from the heating gases as this arrangement. There is also no necessity to make the inner tube $c$ over its entire length of first quality refractory material. If the flame temperature should, also in this case, cause local excessive heating, a uniform temperature may be obtained by the utilization of two or more combustion chambers.

Such an arrangement is indicated in Fig. 4, in which $a$ is the revolving furnace, $b$ the annular space through which the heating gases flow, $c$ the inner tube through which the material travels, $d$ is the first combustion chamber, with the nozzles $g$, $e$ is a second combustion chamber with the nozzles $f$.

Corresponding arrangements might be made in other furnaces.

Revolving furnaces with enlarged heating zone are preferably employed. In furnaces of this type the masses are not only kept permanently in movement but the masses are spaced in thin layers thus contributing also to facilitating and improving the decomposition process.

In Figs. 5 to 7 a form of construction of a revolving furnace with enlarged heating zone and muffle-like heating is shown.

$a$ is the combustion zone, $b$ the zone for preliminary heating into which the material to be treated is charged by a charging device. The furnace, which is preferably slightly inclined, conveys by its movement the material through the preliminary heating and combustion zones, whence the residue constituents get into the cooling zone $c$ and thence into the discharging device $d$.

The fuel, for instance oil in air or gas, flows from the pipe $e$ through the pipes $f$ rotating with the furnace, to the burner nozzles $g$. In the annular space $h$ the combustion takes place. The gases from combustion flow through the outlet $i$ into the flue $k$ and eventually thence into the chimney. The gaseous products of decomposition, for instance of complex-fluorides, flow through the preliminary heating zone $b$ into a discharge-pipe.

Fig. 6 shows a section of the furnace on line C—D. The annular space $h$, which may be subdivided, and the flue $i$ are visible.

Fig. 7 shows a section on line E—F. $l$ are the discharge openings for the solid material from the furnace.

A reciprocating movement of the rotary furnace, instead of the rotating movement, has proved to be quite as advantageous as the utilization of an enlarged heating zone. For this reason it is advisable to provide, eventually, in the various forms of construction of the rotary furnaces which have been described for the possibility of a reciprocating movement.

Another kind of heating arrangement may be mentioned which has proved to be practical for carrying out the new method according to the invention.

In Fig. 8, $a$ is a conical revolving body which is directly heated from below with the aid of a gas supply $b$ or indirectly by means of radiating bodies $c$. The gases from combustion escape from the cone through pipe $d$ in such a manner that they do not come into contact with the gas from decomposition.

The material to be decomposed is supplied at $e$, drops around the chimney $d$, the preliminary heating beginning already, and is distributed over the cone along the line indicated in dash-lines and according to the direction of the arrow. The angle of inclination and the revolving speed of this cone have to be regulated so that the material to be decomposed, for instance sodium silico fluoride, is perfectly decomposed when moving over the cone.

The solid constituent of the material drops around the cone into the discharging funnel $f$. The casing $g$ which encloses the cone keeps the gaseous components together which are delivered through a pipe $h$.

At convenient points inlet openings for the admission of a diluting gas may be arranged so that the delivering of the volatile fluoride is carried out more smoothly.

The space above the conical body, as shown on the drawings, which might consist of a plane plate, may have the shape of a shaft. In any case it is advisable to supply at the center of the revolving body the material to be treated. Electric heating bodies will be arranged on the lower surface of the plate.

Instead of the heating by means of a gas or radiating bodies the heating may be effected by electric-heating bodies or by radiating heat from above acting upon the material to be decomposed.

A special kind of heating is that in which the combustion of the fuel takes place in one or several combustion-chambers from which the flame or heating gases or only the latter flow over into the space to be heated.

The waste-gases produced might be further utilized for heating purposes, interior or exterior heating, or for carrying through reactions for supplying the combinations required for the decomposition of the complex-fluoride, or lead directly to the same.

The decomposition chambers may be made, according to the invention, of special metal alloys or they may be lined at their interior walls with special alloys. Iron-nickel-, iron-chromium-, or iron-nickel-chromium alloys are used. Alloys are preferably used which are poor in carbon.

It has been found, that such iron alloys not only resist the influence of the heat but also the combined effects of heat and fluor compound and also of the volatile fluor combination.

Besides the fundamental alloys of the iron-chromium-nickel, such alloys are adapted to be used which contain little or suitable addition of other metals. Manganese, molybdenum, tungsten, canadium, cobalt, aluminium, antimony, silicon, tin, bismuth may be mentioned. The first mentioned alloys are of great importance.

By the present invention it has become possible to decompose complex-fluorides in such a manner as necessary for economical and technical reasons, the working being carried out in the most various ranges of temperature.

I claim:

1. Process for the decomposition of complex hydrofluoric salts, which comprises heating the salts to be decomposed while avoiding temperatures at which a partial melting or sintering takes place and at the same time maintaining the atmosphere of the decomposition chamber free from water or steam.

2. Process for the decomposition of complex hydrofluoric salts, which comprises heating the salts while avoiding temperatures at which a partial melting or sintering of the mass takes place, and simultaneously during the decomposition process passing moisture-free gases over the material to be decomposed, to rapidly remove the volatile fluoride formed.

3. Process for the decomposition of complex hydrofluoric salts, which comprises heating the salts, while avoiding temperatures at which a partial melting or sintering of the mass takes place, in a gas-rarified chamber in an atmosphere from which the greater portion of the water has been removed.

4. Process for the decomposition of complex hydrofluoric salts, which comprises admixing the salts with metallic fluoride and heating the mixture, while avoiding temperatures at which partial melting or sintering takes place, in an atmosphere which is maintained free from water or water vapor.

5. Process for the decomposition of complex hydrofluoric salts, which comprises introducing the salts directly to the point of greatest heating in the decomposition chamber, heating the said salts while avoiding temperatures at which partial melting or sintering of the salts takes place and maintaining the atmosphere of the decomposition chamber free from water or water vapor.

In testimony whereof I affix my signature

MAX BUCHNER.